3,251,713
Patented May 17, 1966

3,251,713
METHOD OF PRODUCING DELAMINATION RESISTANT PAPER-BACKED PRESSURE-SENSITIVE ADHESIVE TAPES UTILIZING ELASTOMERIC COPOLYMER AND ISOCYANATE ADDUCT
John W. Crone, Jr., Hickory, N.C., assignor to Shuford Mills, Inc., Hickory, N.C., a corporation of North Carolina
No Drawing. Filed Oct. 8, 1962, Ser. No. 229,204
1 Claim. (Cl. 117—122)

This invention relates to pressure-sensitive adhesive tapes and methods for their preparation. More particularly, it concerns pressure-sensitive adhesive tapes formed with fibrous non-woven backings having improved delamination resistance and methods for the preparation of such tapes which comprise unification of fibrous non-woven webs by internal bonding of the fibers with special unifying material.

Pressure-sensitive adhesive tapes may be broadly classified in accordance with the type of material used as a backing for the tapes. On this basis, such tapes can be subdivided into two general classes, namely, fibrous backing and non-fibrous backing tapes. Paper and cloth tapes are representative of the first type while the latter is most commonly encountered in cellophane and plastic film tapes.

In the broad category of fibrous backing tapes, there are two general subdivisions, namely, the non-woven backing tapes and the woven backing tapes. Tapes made with paper backings represent by far the bulk of pressure-sensitive adhesive tapes in the non-woven category while cloth surgical tape accounts for a major portion of the woven backing tapes.

It is possible to form non-woven backings which may be satisfactorily employed in adhesive tapes without use of internal resin bonding materials being incorporated in the fibrous backing. Such form of tape is disclosed, for example, in copending application of Crone et al. Serial No. 74,944, filed December 9, 1960, now abandoned, which describes pressure-sensitive adhesive tapes made from self-bonded non-woven fibrous webs of polyester materials. However, the majority of fibrous non-woven backing tapes employ a backing that has been treated with a material that increases the internal bonding of the fibers. Such bonding material is commonly referred to in the tape industry as a "unifying material" and the treatment of the fibrous web is described as "saturation," e.g., see the glossary of terms used in the pressure-sensitive tape industry as reported in the publication "Test Methods For Pressure-Sensitive Tapes," revised edition of May 1959, published by the Pressure Sensitive Tape Council.

Numerous methods and materials have been described in printed technical literature and patents for producing unified fibrous non-woven webs suitable for the formation of adhesive tapes. One of the early unifying materials employed with paper was a mixture of glue and glycerine (see U.S. Reissue Patent 17,760). As technical developments in the adhesive tape field progressed, a variety of other unification materials have been tested and used. Examples of such unifying materials include vulcanized rubber (see U.S. 2,410,078), synthetic rubbers (see U.S. 2,592,550), combinations of elastomeric polymers with thermosetting resins (see U.S. 2,848,105), carboxylic acid modified acrylic ester polymers (see U.S. 3,026,217) and combinations of depolymerized rubbers or low molecular weight polymers with isocyanates or isothiocyanates (see Canadian Patent 570,420).

The highly competitive aspects of the adhesive tape industry make it imperative for a tape manufacturer to obtain the best possible qualities in a tape at the lowest possible cost. It is well known in the industry that all unifying materials are not equally effective nor do the separate unifying materials improve to the same extent various physical properties of the tape backing. For example, some unifying materials improve elongation without materially effecting or perhaps even adversely effecting other physical characteristics of the backing such as flexibility, tear strength, tensile strength or internal bonding. On the other hand, another unifying material will be characterized by, for example, improvement in tensile strength without noteworthy effect upon the other properties.

Resistance against delamination is an important property for pressure-sensitive adhesive tapes to possess. If the backing of a tape does not have sufficient bonding of its components to resist delamination under adverse forces applied to the tape such as when the tape is unrolled from a roll or a strip of tape is pulled off of a surface, the tape is unsatisfactory and will be rejected by prospective users. Industrial applications involving automatic dispensers which subject tape to high shearing forces in high speed unrolling of tape increase the necessity of obtaining the absolute maximum resistance against delamination in pressure-sensitive adhesive tapes of the fibrous non-woven variety. Of course, in attaining this desired result, the tape manufacturer does not want to unduly increase the cost of manufacturing of the tape or adversely effect other important characteristics of a tape such as tensile and tear strength, elongation or the like.

A principal object of this invention is the provision of new and improved forms of pressure-sensitive adhesive tapes made with fibrous non-woven backings having improved delamination resistance.

Further objects include:

(1) The provision of such improved adhesive tapes which are comparable in elongation and strength properties to competitive existing tapes.

(2) The provision of new unifying materials for use in forming internally bonded fibrous non-woven sheets suitable for use in the formation of pressure-sensitive adhesive tapes.

(3) The provision of new methods for producing paper and other fibrous non-woven backing adhesive tapes having a relatively high resistance to delamination.

(4) The provision of new and improved unified adhesive tape backings characterized by a relatively very high delamination resistance for the amount of unifying material incorporated in the backing web and the cost of production of such unified web.

(5) The provision of new methods of unifying paper and other non-fibrous backings that may be carried out on simple tape forming and processing equipment and with the use of readily available ingredients.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by a process which comprises impregnating a fibrous non-woven web with between about 50 and 125% by weight, based upon the dry weight of the web, of a mixture of (1) an elastomeric diene polymer and (2) an organic polyisocyanate adduct of an isocyanate reactive compound selected from the group consisting of monohydric phenols and monoamides, the weight ratio in such mixture of said polymer (1) to said adduct (2) being between about 1000:1 and 20:1, heating the impregnated paper to a temperature sufficient to cause reaction between the adduct and the elastomeric polymer to effect a curing of the mixture creating an internal bonding of the web fibers and thereafter applying the layer of pressure-sensitive adhesive to one side of the resulting unified fibrous web.

Advantageously, the elastomeric polymer and isocyanate adduct are used in the form of an aqueous emulsion in order that a sufficient amount of the elastomeric polymer of high molecular weight may be impregnated in the paper or other fibrous web in a single saturation step.

It is also advantageous for the paper or other fibrous web which has been impregnated with the elastomeric polymer and isocyanate adduct as specified above to be heated to a temperature between about 150° C. and 200° C. for about 1 to 5 minutes in order to effect the required curing of the mixture to create the internal bonding of the web fibers.

Operating in accordance with the invention as broadly described above, there can be obtained new and improved pressure-sensitive adhesive tapes having improved delamination resistance that comprise a unified fibrous non-woven web in which the fibers forming the web are internally bonded by unifying material resulting from the heat curing of a saturant composition comprising an elastomeric diene polymer and an organic polyisocyanate adduct of an isocyanate reactive compound selected from the group consisting of monohydric phenols and monoamides, the weight ratio of said polymer to said adduct in the composition being between about 1000:1 and 20:1, said unifying material comprising between about 30 to 55% by weight of the unified web, and a pressure-sensitive adhesive covering at least one side of said unified web.

A more detailed understanding of the new adhesive tapes and the processes for their production may be had from the following specific examples of the preparation of tape in accordance with the invention. In such example description and throughout the remainder of the specification and claims, all parts and percentages are by weight unless otherwise specified.

A saturation composition was formed by mixing one part of methylene bis-(4-phenylisocyanate) bisphenol adduct (commercially available as the trade name product "Hylene M.P."), with an aqueous emulsion of an elastomeric copolymer formed by the copolymerization of about 20% acrylonitrile, 79% butadiene and 1% acrylic acid. The emulsion contained about 35% by weight of the polymer which had an emulsion particle size about 1000 Angstroms and a Mooney viscosity about 60. The adduct was first finely ground in a ball mill in water and was then added slowly streamwise to the stirred emulsion to disperse it in the emulsion forming a saturant composition which was stable for at least 24 hours at ambient temperatures or higher, e.g., 20°–70° C.

A saturating type kraft crepe paper of 28 pounds basis weight, e.g., paper sold under the trade name "301 Duracel," was impregnated with the emulsion by first leading the paper over the surface of a bath of the emulsion so that the paper floated for a short period of time on the emulsion surface and then was caused to pass downwardly into the emulsion (the so-called float-dip procedure) to attain a complete saturation of the paper with the aqueous emulsion. The paper was then withdrawn from the saturation bath and passed through nip rolls controlled to give a desired pick-up of the saturation composition. From these rolls, the impregnated paper was passed through a heating oven in which the dwell time of the paper was about 1.5 minutes with the paper being heated to a temperature of about 200° C. by the time it emerged from the exit end of the oven.

In another case, the same procedure was repeated substituting in this case a 4 mil rope paper, such as the paper commercially sold under the trade name "Flexrope."

In yet another case, the foregoing operations were repeated with the kraft paper and the rope paper being impregnated and cured as described with the butadiene-acrylonitrile copolymer emulsion, but without the addition of the isocyanate adduct.

In still another case, the operations as described were repeated with the rope paper and kraft papers, but with the isocyanate adduct being added in the amount of 2.5 parts per 97.5 parts of polymer in the emulsion in one instance and 5 parts of adduct per 95 parts of polymer in the emulsion in still a further case.

There was applied over the surface of each of the individual unified papers as produced above, a pressure-sensitive adhesive coating from a liquid adhesive composition containing the following ingredients:

| | |
|---|---|
| Synthetic rubber polymer (75% butadiene—20% styrene) | 50 |
| Natural rubber | 50 |
| Dehydrogenated rosin | 90 |
| Calcium silicate | 90 |
| Zinc oxide | 50 |
| Mineral oil | 30 |
| Rubber anti-oxidant | 2 |
| Toluene | 600 |

The adhesive composition was applied to produce a pressure-sensitive adhesive layer amounting to about 3 ounces per square yard of tape and the tape was dried in an oven at a maximum temperature of about 100° C. until the volatile solvents in the adhesive layer had been evaporated.

Using standard established tests of the pressure-sensitive tape industry, the elongation, tensile strength and tear strength of the resulting tapes were determined and the internal bonding of the paper was determined on the uncoated paper. The data resulting from these tests is reported in the following table:

*Table I*

| Saturant | Paper | Elongation | Tensile | Pick-up | Tear | D.R. |
|---|---|---|---|---|---|---|
| 1% | Kraft | 23 | 18 | 102 | 19 | 68 |
| 1% | do | 23 | 16 | 90 | 16 | 92 |
| 1% | do | 19 | 17 | 80 | 15 | 102 |
| 1% | do | 22 | 15 | 70 | 17 | 89 |
| 2.5% | do | 23 | 18 | 103 | 15 | 82 |
| 2.5% | do | 23 | 17 | 90 | 16 | 90 |
| 2.5% | do | 23 | 19 | 80 | 14 | 85 |
| 2.5% | do | 23 | 17 | 70 | 15 | 72 |
| 5% | do | 23 | 19 | 90 | 16 | 80 |
| 5% | do | 24 | 18 | 80 | 15 | 65 |
| 5% | do | 24 | 17 | 70 | 15 | 60 |
| 1% | Rope | 5 | 47 | 100 | 26 | 60 |
| 2.5% | do | 6 | 50 | 102 | 22 | 59 |
| 5% | do | 5 | 49 | 102 | 26 | 55 |
| None | Kraft | 19 | 18 | 90 | 20 | 59 |
| None | Rope | 6 | 46 | 100 | 26 | 51 |

In Table I, the values under "elongation" are the amount of stretch in the tape measured at the point of break expressed in percentage (PSTC test 6). The values under "tensile" are the force expressed in pounds per inch of width of tape required to break the tape strip (PSTC test 4). The values under "tear" are the force required to tear a strip of tape in accordance with the Finch tear test (ASTM D827–47). The values under "D.R." represent delamination resistance as the force in ounces per inch of width of tape required to split the tape apart along the plane of the backing web. The test is conducted in accordance with the following procedure:

(1) Cut the sample approximately 4" x 8" and coat on both sides with a solution of 80 parts methyl ethyl ketone and 20 parts vinyl chloride polymer.

(2) Oven dry for 30 minutes in an oven at around 65° C.

(3) Place two 1" strips of "Bondex" white tape on opposing sides of the coated paper. Align them exactly, in the machine direction.

(4) Make three passes with a hot iron set on "cotton" on each side of the paper. The pressure exerted should be made with care so as not to slide the tape before it is bonded.

(5) Trim the sample along the "Bondex" obtaining a 1" x 6–8" sample with enough excess "Bondex" extending over one end of the sample to fix in the clamps of a tensile tester.

(6) Place the assembly under water for two hours and then allow to air dry in a conditioned room (21 C. and 50% R.H.) for 30 minutes.

(7) The delamination is started by hand to go across the 1" width. When this is accomplished, one tab of the "Bondex" is placed in the top clamp and the other in the bottom clamp of the tensile tester so that they pull 180° from each other. The layers should continue to pull apart evenly.

(8) The tester is set up for five and not more than ten pounds and is run at twelve inches per minute.

(9) The average delamination value for not less than five specimens is reported in ounces per inch of width to the nearest ounce.

The figures under the heading "Pickup" in Table I indicate the parts by weight of polymer left in the paper after passage through the nip rolls per 100 parts by dry weight basis of the paper, the actual weight of saturation emulsion being about three times as great. The heading "Paper" indicates whether kraft or rope paper was used and the heading under "Saturant" gives the amount of isocyanate adduct in the saturant composition in terms of percent by weight of elastomeric polymer.

The table indicates that in the range of 1 to 5% added isocyanate adduct, the resulting tapes have improved delamination resistance, without other physical properties as reported being materially effected as compared with the control tapes which contain no added isocyanate adducts. The improvement in delamination resistance is particularly increased with a percentage addition range of 1 to 2.5% and with a pickup of saturant solids of between about 80 and 90%.

One of the two essential ingredients of saturant compositions to be used in making new adhesive tape of the present invention is an organic polyisocyanate adduct of an isocyanate reactive compound selected from the group consisting of monohydric phenols and monoamides. A preferred material of this class, because of its general stability at ambient temperatures in the saturant compositions combined with rapid reactivity at curing temperatures, is the bisphenol adduct of methylene bis-(4-phenylisocyanate). However, water stable adducts of other diisocyanates with other phenols may be used including 4,4'-diphenyldiisocyanate bisphenol adduct; 1,5-naphthalene diisocyanate bis-a-naphthol adduct; 1,5-octahydronaphthalene diisocyanate bisphenol adduct and ethylene bis-(4-phenoxy-4-phenylisocyanate).

In addition to the diisocyanate adducts of monohydric phenols, the bisadducts of diisocyanates with imides are contemplated for use in this invention. An example of such compounds is the 4,4'-diphenyldiisocyanate bisadduct of succinimide. Further examples of such compounds contemplated for use in accordance with the invention include the bisadduct of succinimide with 2,4-tolylene diisocyanate; the bisadduct of phthalimide with 1,5-naphthalene diisocyanate; the glutarimide bisadduct of 4,4'-diphenylene methane diisocyanate; the carbimide bisadduct of methylene bis-(4-phenylisocyanate) and comparable compounds.

The other essential ingredient of the saturant compositions used in accordance with the invention is an elastomeric diene polymer. Preferred materials of this general class are the copolymers formed from a major portion of butadiene and a minor portion of acrylonitrile, preferably with a minor amount of an $\alpha,\beta$-ethylenically unsaturated monocarboxylic acid such as acrylic, itaconic, methacrylic and comparable copolymerizable mono unsaturated carboxylic acids, e.g., a copolymer of 15–24% acrylonitrile, 75–80% butadiene and 1–5% acrylic acid. However, other diene polymers having sufficiently high molecular weight to be elastomeric, i.e., preferably a molecular weight to give a Mooney viscosity ML–4 of at least 50 and preferably between about 50 and 150, may be used. This includes the homopolymers of dienes such as butadiene and isoprene and piperylene and the like, or copolymers of such dienes and other copolymerizable material such as acrylonitrile, styrene, acrylic acid esters, methacrylic acid esters and the like. Such materials are commercially available under the trade name "508–J," "Nitrex," "Naugatex." Examples of such materials are given in U.S. Patents 2,592,505; 2,848,105 and 3,026,217.

In order that a diene polymer of sufficiently high molecular weight can be formed in a liquid composition that may satisfactorily permeate the fibrous web to be treated, the polymers are preferably used in carrying out the procedures of this invention dispersed as fine particles, e.g., particle size of between about 500 to 2000 Angstroms, in an aqueous medium containing a small amount of emulsifying agent, either of the anionic or nonionic type, to form a stable emulsion, preferably one having a viscosity between about 25 and 1000 centipoises.

The elastomeric diene polymer emulsion will advantageously contain about 25 to 50% by weight of diene polymer as the dispersed phase along with about 0.1 to 5% by weight, based upon the weight of the elastomeric diene polymer, of the diisocyanate adduct. Such a saturant composition, in addition to the two essential ingredients just discussed, may comprise small amounts, e.g., 1 to 10% by weight, based upon the weight of the diene polymer, of other added materials such as anti-oxidants, chelating agents, dyes, pigments and related rubber additives known to be useful in the art in the compounding and use of paper saturants.

It has been surprisingly found that the maximum increase in delamination resistance of webs formed in accordance with the invention are not obtained with the maximum amount of saturant which can be impregnated into the fibrous webs. Thus, it is possible using aqueous emulsions to impregnate an absorbent paper with as much as about 125% or more of elastomeric polymer, but it has been found that impregnation between about 70 and 100% and especially about 80 to 90% yields unified webs having the most improved delamination resistance. As a result, preferred adhesive tapes in accordance with this invention include a unified fibrous web comprising between about 30 to 55% by weight and especially 45 to 50% by weight of saturation solids, i.e., weight of elastomeric diene polymer plus chemically reacted diisocyanate and minor amounts of other additive materials if employed based upon the total weight of the unified web.

An essential component of the new adhesive tapes is the pressure-sensitive adhesive layer. Numerous forms of such adhesives are known and may be used with more or less success in forming the new tapes. Such adhesives generally employ an elastomeric base to which is added tackifying resins and fillers. The foregoing example discloses a good recipe for a pressure-sensitive adhesive which may be employed in forming the new adhesive tapes. Additional examples of useable pressure-sensitive adhesive compositions are found in numerous U.S. patents, e.g., U.S. 2,142,039; 2,156,380; 2,498,338 and 2,750,314.

The adhesive is applied in sufficient amount to create an aggressive tacky surface upon the tape backing. For preferred adhesives, this will be between about 2 and 5 ounces per square yard of backing.

As illustrated by the foregoing example, satisfactory adhesive tape may be prepared in accordance with this invention by directly applying the pressure-sensitive adhesive to the new tape backing sheets. However, it may be advantageous to first apply a bonding or primer coat to the backing sheet before the adhesive layer is coated on to the backing. Many types of bonding or primer compositions are known to the art, and a selection of one which is best suited for anchoring either the adhesive mass or a release layer or back-size to the backing sheet may be readily accomplished by those skilled in the art. Usually, the primer is composed of the same general ingredients as the adhesive mass, but in proportions necessary to give a more tacky mass. The primer also is applied more sparingly than the adhesive mass. For example, the primer is advantageously applied in an amount between about 0.1 and 0.3 ounce per square yard. Examples of useable primers are found in U.S. Patents 2,177,627; 2,236,567; 2,424,996 and 2,897,960.

Back-size or release compositions may be applied to the tape backing on the side opposite to the adhesive mass. These materials are designed to permit tape to be unrolled without exertion of too great a force by preventing the adhesive mass from adhering too strongly to the opposite surface of the underlying portion of the tape when rolled up in a roll. However, a satisfactory release or back-size layer should not detrimentally affect the aggressive tacky properties of the adhesive layer during storage of the tape in roll form. Suitable release or back-size compositions, which may be chosen by those skilled in the art for use with the particular adhesive mass employed in the adhesive tape, are disclosed in U.S. Patents 2,496,239; 2,548,980; 2,876,895 and 2,880,862.

The new adhesive tapes of this invention may be employed generally for purposes for which pressure-sensitive adhesive tapes are known to be useful excluding, of course, applications requiring extra-strength tapes. Because the new tapes may be manufactured at a relatively low cost while possessing excellent delamination resistance, they are particularly useful where large quantities of adhesive tape are called for and especially where the tape is to be applied from high-speed dispensers.

The subject matter to be protected by United States Letters Patent in view of the foregoing specification is defined in the following claim:

A method of producing paper-backed pressure-sensitive adhesive tape having a relatively high resistance to delamination which comprises impregnating saturating-type crepe kraft paper of about 28 pounds basis weight with between about 80 and 90% by weight, based upon the dry weight of the paper, of an elastomeric copolymer by immersion of the paper in an aqueous emulsion containing about 35% by weight of said elastomeric copolymer particles of a particle size about 1000 Angstroms, said elastomeric copolymer consisting of 20% acrylonitrile, 79% butadiene and 1% acrylic acid and having a Mooney viscosity about 60, said emulsion containing between 1 and 2.5% by weight of methylene bis-(4-phenylisocyanate) bisphenol adduct based upon the weight of said elastomeric copolymer, heating the impregnated paper to a temperature between about 150° C. and 200° C. for between about 1 to 5 minutes to effect a curing of said mixture creating an internal bonding of the paper fibers and thereafter applying a layer of pressure-sensitive adhesive to one side of the resulting unified paper.

References Cited by the Examiner

UNITED STATES PATENTS

| | | | |
|---|---|---|---|
| 2,797,232 | 6/1957 | Bunge | 260—77.5 X |
| 2,855,421 | 10/1958 | Bunge et al. | 260—77.5 X |
| 3,012,989 | 12/1961 | Steckler et al. | 260—47 |
| 3,108,084 | 10/1963 | Whitehill et al. | 260—77.5 X |

FOREIGN PATENTS

| | | |
|---|---|---|
| 243,246 | 1/1960 | Australia. |
| 768,075 | 2/1957 | Great Britain. |

WILLIAM D. MARTIN, *Primary Examiner.*

H. E. COLE, *Examiner.*

W. D. HERRICK, *Assistant Examiner.*